US006425298B1

(12) United States Patent
Jackson et al.

(10) Patent No.: US 6,425,298 B1
(45) Date of Patent: *Jul. 30, 2002

(54) APPARATUS FOR PASSIVE REMOVAL OF SUBSURFACE CONTAMINANTS AND VOLUME FLOW MEASUREMENT

(75) Inventors: Dennis G. Jackson, Augusta, GA (US); Joseph Rossabi, Aiken, SC (US); Brian D. Riha, Augusta, GA (US)

(73) Assignee: Westinghouse Savannah River Company, LLC

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/506,653

(22) Filed: Feb. 17, 2000

(51) Int. Cl.⁷ ................................................. G01N 1/00
(52) U.S. Cl. .................................................. 73/863.73
(58) Field of Search ...................... 73/864.73, 864.74, 73/198, 861.42, 861.47, 861.52–861.57, 864.75; 166/370, 372; 405/128, 129

(56) References Cited

U.S. PATENT DOCUMENTS

| 3,956,933 A | 5/1976 | Metzger ...................... 73/209 |
|---|---|---|
| 4,085,614 A | 4/1978 | Curran .................... 73/194 VS |
| 4,317,375 A * | 3/1982 | Egert ....................... 73/861.55 |
| 4,486,744 A * | 12/1984 | Pratt et al. ................ 73/861.56 |
| 4,559,834 A | 12/1985 | Phillips ..................... 73/861.55 |
| 4,873,873 A | 10/1989 | Day ......................... 73/861.63 |
| 5,099,698 A | 3/1992 | Kath ........................ 73/861.56 |
| 5,379,651 A | 1/1995 | Doolittle .................. 73/861.56 |
| 5,458,006 A | 10/1995 | Roqueta ................... 73/861.42 |
| 5,616,841 A | 4/1997 | Brookshire .............. 73/152.29 |
| 5,641,245 A | 6/1997 | Pemberton .................. 405/128 |
| 5,817,950 A | 10/1998 | Wiklund .................. 73/861.66 |
| 5,908,990 A | 6/1999 | Cummings ............... 73/861.22 |
| 5,911,219 A | 6/1999 | Aylsworth ............. 128/205.23 |

* cited by examiner

Primary Examiner—Robert Raevis
(74) Attorney, Agent, or Firm—McNair Law Firm, P.A.

(57) ABSTRACT

A system for improving the Baroball valve and a method for retrofitting an existing Baroball valve. This invention improves upon the Baroball valve by reshaping the interior chamber of the valve to form a flow meter measuring chamber. The Baroball valve sealing mechanism acts as a rotameter bob for determining volume flow rate through the Baroball valve. A method for retrofitting a Baroball valve includes providing static pressure ports and connecting a measuring device, to these ports, for measuring the pressure differential between the Baroball chamber and the well. A standard curve of nominal device measurements allows the volume flow rate to be determined through the retrofitted Baroball valve.

9 Claims, 2 Drawing Sheets

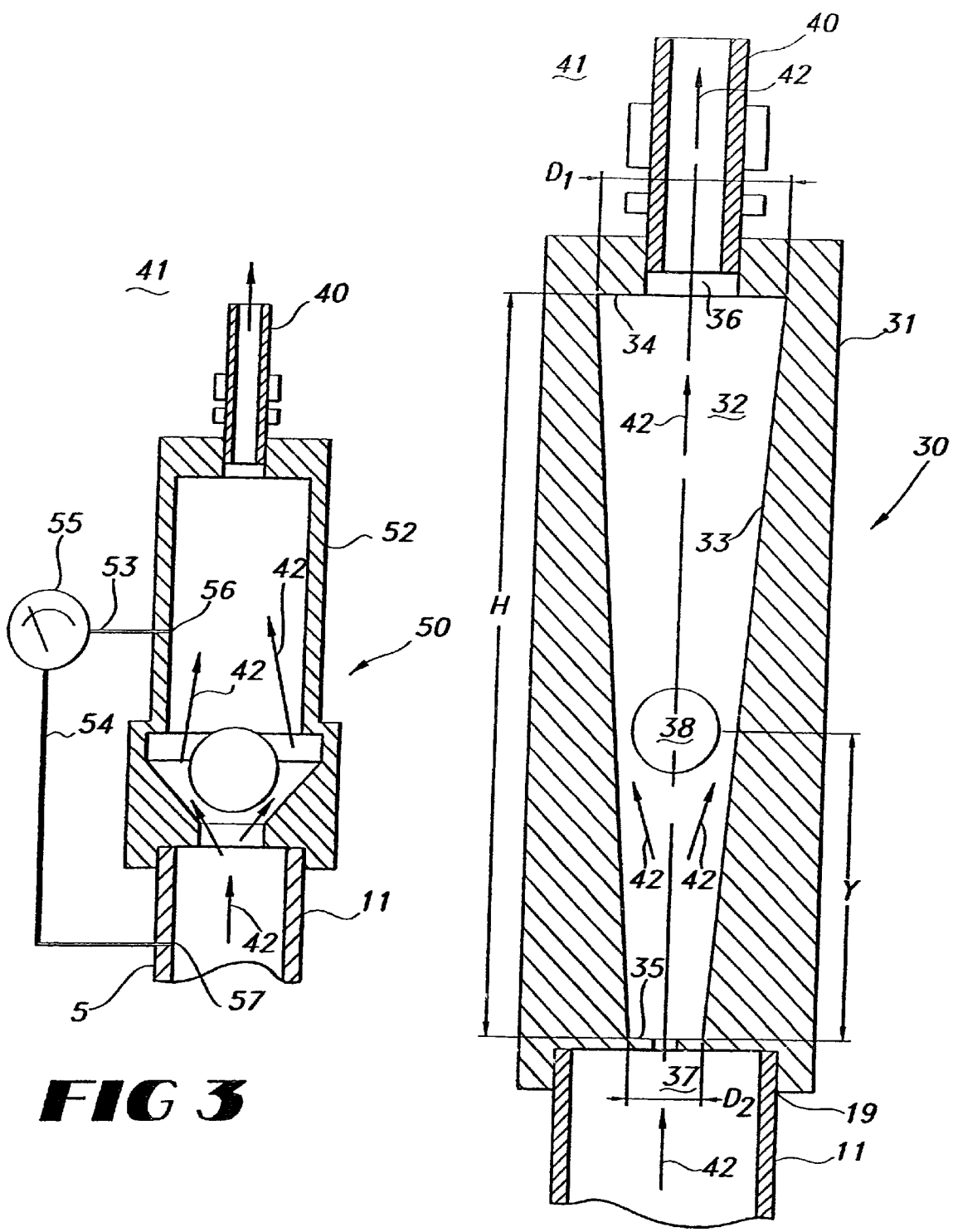

APPARATUS FOR PASSIVE REMOVAL OF SUBSURFACE CONTAMINANTS AND VOLUME FLOW MEASUREMENT

The U.S. government has rights in this invention pursuant to contract number DE-AC09-96SR18500 between the U.S. Department of Energy and Westinghouse Savannah River Company.

FIELD OF THE INVENTION

This invention relates generally to systems for passive removal of subsurface contaminants and flow measurement. More specifically, this invention is a passive removal valve apparatus for removing subsurface contaminants integrated with a volumetric flow meter.

BACKGROUND OF THE INVENTION

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, and metal contaminants. Such contaminants can be found and dealt with in the vadose (unsaturated) zone found between the surface of the earth and the water table, at the interface between the vadose zone and the water table, and in the saturated zone below the water table.

There are many proposed methods for removal of surface contaminants, such as excavation followed by incineration, in situ vitrification, biological treatment, chemical additives for deactivation, radiofrequency-heating, etc. Although successful in some applications, these methods can be very expensive (hundreds of dollars per ton) and are not practical if many tons of soil must be treated.

One example of low cost, efficient contaminant extraction is disclosed in U.S. Pat. No. 5,641,245 to Pemberton et al., which is incorporated herein by reference. The Pemberton patent discloses an apparatus for passively removing subsurface contaminants. The apparatus provides a means for opening and closing a valve (the "Baroball" valve) as the atmospheric and subsurface pressures differ from one another. Basically, the apparatus allows a well to breathe out contaminants during low atmospheric pressure.

The apparatus includes a riser pipe extending through a well into the ground reaching a position above the water table, where contaminants are likely to be present. The end of the pipe positioned above the water table contains perforations allowing contaminant vapors to enter the pipe. A portion of the riser pipe extends upward above the ground and is in fluid communication with a valve. The valve is formed to have a low cracking pressure and is responsive to changes in ambient atmospheric pressure.

The Baroball valve is formed from a vertically oriented chamber having a conic shaped valve seat. A ball is disposed in the valve chamber and rests on the valve seat when equalization of atmospheric and subsurface pressure exists. Cracking pressure, the pressure required to lift the ball, is related to the density or weight and surface area of the ball and is preferably no more than about one mbar. As subsurface pressure rises above atmospheric pressure the ball rises in the valve chamber allowing contaminants to escape through the valve out into the atmosphere.

The benefits of the Baroball valve are numerous. The valve provides passive release of contaminants from a well with minimal construction costs, maintenance, and operation costs, and additionally requires no external energy source. The Baroball valve further prevents the flow of air into a well, and thereby increases the amount of contaminants that are released during periods of low pressure by preventing dilution of contaminants in the well. The valve enclosure is also transparent, semi-transparent, or is formed to have a window, so that malfunctioning of the apparatus can be visually detected. Thus, the valve provides a low cost method of removing subsurface contaminants.

However, there are disadvantages associated with the Baroball apparatus. Although the Baroball valve provides passive release of subsurface contaminants, it does not provide a mass flow measurement of the amount of contaminants released through the valve. Therefore, an external device must be used to measure the mass flow through the valve by combining independent measurements of volume flow rate with contaminant concentration. Many external apparatuses, for attachment to the Baroball valve, exist for measuring volume flow through the valve mechanism. Several are discussed below.

U.S. Pat. No. 4,873,873 to Day discloses a system for metering the flow rate of air through a duct in which gates are pivotally mounted and connected together to vary the area of the duct. The gates are balanced so as to be effectively weightless. The forces on and the positions of the gates correspond to the pressure and the flow rate in the duct.

U.S. Pat. No. 5,616,841 to Brookshire is directed to a metering pipe system that is positionable in fluid communication with a well in a landfill for determining gas flow rate through the well. The device includes an upstream segment and a downstream segment coupled together and separated by an orifice plate. Specifically, the segments are advanced into the coupling toward each other, on opposite sides of the orifice plate from each other. Upstream and downstream pressure ports are respectively formed through the walls of the upstream and downstream segments and the coupling adjacent the orifice plates. The difference in pressure at the ports is correlated to a flow rate through the pipe.

U.S. Pat. No. 4,559,834 to Phillips et al. is directed to a flow meter arrangement including an elongated body adapted to be disposed in an upright position with a typical rotameter design utilizing a floating ball mechanism. The flow meter design has a first valve at the base of the rotameter tube and a second valve at the top of the rotameter chamber. The flow meter arrangement can be adapted for pressure or vacuum applications.

U.S. Pat. No. 5,099,698 to Kath et al. is directed to an electronic readout for a rotameter flow gauge which includes a means for optically scanning the rotameter flow gauge and determining the position of a float within the rotameter.

Finally, U.S. Pat. No. 5,379,651 to Doolittle is directed to an improved electronic monitoring arrangement for a rotameter device utilizing a single point source of radiation at one side of the rotameter and a vertical array of detectors diametrically opposite to it. The elevation of the radiation source is identical to the uppermost elevation of the radiation detectors. The elevation of the rotameter float will intersect the vertical array of detectors allowing for a reading of the flow rate.

The above references provide systems and methods of measuring airflow mass. However, each requires that it be attached to the passive contaminant removal system. An external flow meter device placed in fluid communication with the passive valve is disadvantageous for several reasons.

First, the passive valve is just that, passive. The Baroball valve requires no external power source. Thus, multiple valves can be deployed in the field without building an infrastructure for providing power to the removal system. Most flow-meter systems require an external energy source for powering the measuring device. Therefore, all electronic flow meters requiring external energy diminish the advantages gained by a passive system. Although flow meters exist that do not require external energy sources, these devices like their electronic counterparts cause back pressure that hinders the operation of the passive valve.

The Baroball system operates in a very narrow pressure differential range, generally a few mbars. A mbar change in pressure can cause the valve to open, releasing contaminants. Therefore, any back pressure or airflow constriction caused by an external flow meter device can cause the valve to malfunction. Additionally, one advantage of the Baroball system is to provide a low cost and low maintenance contaminant removal option. Thus, external flow meter devices add unnecessary expense; thereby defeating the Baroball system's low cost advantage.

Consequently, a need exists for a passive removal system for subsurface contaminants including a volume flow meter such that the volume flow meter operates without hindering operation of the valveor adding unnecessary costs.

SUMMARY OF THE INVENTION

This invention relates to an improvement on the Baroball valve. In one embodiment, the valve mechanism of the Baroball is modified to serve as a rotameter bob. Additionally, the valve seat and walls are modified to form the measuring chamber. In a second embodiment, deployed Baroball valves are retrofitted to include two ports, one on each side of the valve and in fluid communication with a static pressure device. The flow rate, through the valve, is proportional to the pressure drop across the device.

Among objects of this invention are to:

provide a passive subsurface contaminant removal system that measures the volume flow of contaminants passing through the valve;

provide a method to retrofit an existing Baroball valve so it measures volume flow of the contaminants passing through the valve; and provide a volume flow-measuring device that does not hinder the operation of the Baroball valve.

BRIEF DESCRIPTION OF THE DRAWINGS

FIG. 2 shows a cross sectional view of the Baroball valve of FIG. 1; and

FIG. 3 shows a cross sectional view of a retrofitted Barbball valve for measuring volume flow through the valve.

DETAILED DESCRIPTION OF THE DRAWINGS

Figure 1:
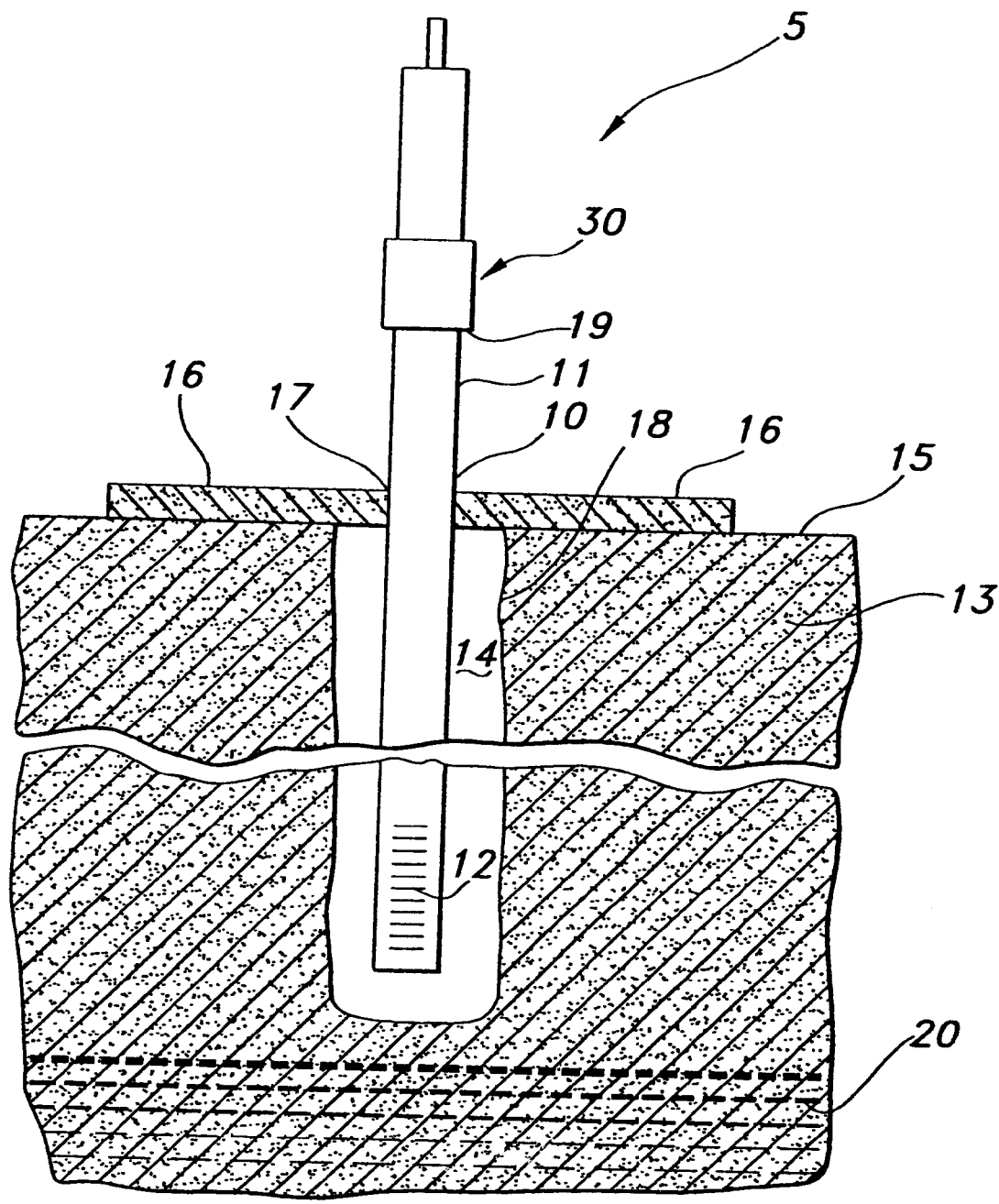
FIG. 1 shows an exemplary passive removal apparatus including an improved Baroball valve of the present invention as deployed in a well.

FIG. 1 discloses a passive contaminant removal apparatus deployed in a well. Apparatus 5 includes a riser pipe 10 with a lower perforated section 12 and top end 11. Riser pipe 10 extends downward into the subsurface 13 through a well 14 to a point just above the water table 20. The perforated section 12 of riser pipe 10 is placed in the vadose zone where the unwanted contaminants exist. Perforations 12 may be formed in the vertical, horizontal or diagonal direction on riser pipe 10. Perforations 12 may also be created by forming a plurality of holes in riser pipe 10 or by cutting away the bottom portion of riser pipe 10 and affixing a screen across the opening of the pipe.

At the surface 15, a well head 16 is formed to seal riser pipe 10 in well 14. This seal also prevents air from seeping into well 14. Preferably, well head 16 is formed from a layer of concrete including an aperture 17 for receiving the riser pipe 10 into well 14. Prior to forming the well head 16, well 14 in an area between riser pipe 10 and well wall 18 may be packed with sand, bentonite and/or grout as is well known to those skilled in the art. A seal (not shown) may be interposed between riser pipe 10 and aperture 17. Riser pipe 10 may be formed from any solid material, but is preferably formed from a non-corrosive non-porous material that does not absorb gaseous contaminants. Preferable materials for riser pipe 10 include stainless steel, Teflon, and polyvinyl chloride (PVC).

Top end 11 of riser pipe 10 terminates above the well head 16 forming a pipe end 19 for receiving a valve 30. The valve 30 can be coupled to top end 11, in any appropriate manner as, for example, by threads or glue.

Referring to FIG. 2, a preferred embodiment of a modified Baroball valve 30, including a flow meter will be described in detail. Valve 30 comprises a chamber 31 and exhaust pipe 40. Chamber 31 includes an interior chamber 32 formed from a sloping interior wall 33. Interior chamber 32 is conical in shape with a wide top end 34 and a narrower valve seat 35. Top end 34 includes an aperture 36 for receiving an exhaust pipe 40. Valve seat 35 also includes an aperture 37 in fluid communication with top end 11 of riser pipe 10.

Valve seat 35 is formed to receive a ball 38. The conical shaped interior chamber 32 forms a rotameter measuring device. Ball 38 of chamber 31 is formed to be lightweight so that a slight pressure differential between the atmosphere 41 and well 14, for example, one mbar, causes the ball 38 to lift from valve seat 35. Ball 38 is made from a smooth lightweight non-porous material such that the ball 38 forms a tight seal when in communication with valve seat 35. Synthetic materials are preferred and ball 38 may be a commercially available table tennis ball.

Chamber 31 is formed from a non-porous non-corrosive solid material such as stainless steel, Teflon, polyvinyl chloride (PVC), polycarbonate or butyrate with dimensional stability and resistance to weathering. Chamber 31 is made of a transparent material or contains a window so that the flow meter can be monitored and readings can be taken. The top end diameter, D1, valve seat diameter, D2, and height, H, of the inner chamber 32 is determined using design guidance associated with rotameter devices, as is well known by those skilled in the art. The flow through rotameter interior chamber 32 is a function of the volume, surface area, and density of ball 38, the annular area of interior chamber 32, the drag coefficient, the gravitational constant, and the fluid density through valve 30, as is well known by those skilled in the art. A uniform taper of interior chamber 32 is a function of D1, D2, H and Y, a reference height of ball 38 in chamber 32, although other variations on the taper are possible. Chamber 32 contains markings (not shown) which indicate the volume flow through the valve 30. Thus, as contaminants flow through valve 30 causing ball 38 to be lifted up into chamber 32, the intersection of ball 38 and a marking on chamber 31 determines the volume flow through valve 30.

Valve seat 35 of chamber 31 can be of the same material as chamber 31 or can be formed from a soft and resilient material, for example, silicones, rubbers, etc. for increasing the sealing action between ball 38 and valve seat 35. Furthermore, valve seat 35 can be formed by placing a washer at the bottom of the interior chamber wherein the washer forms a seat for ball 38.

Cracking pressure, the pressure causing ball 38 to separate from seat 35, is dependent on the density or weight and surface area of ball 38. The cracking pressure should be as low as possible so that the valve works with the slightest differential in atmospheric 41 and well 14 pressure. A valve 30 having a higher cracking pressure, up to thirty mbars or more will also be useful in an apparatus for extracting contaminants from a subsurface. When ball 38 is a table tennis ball cracking pressure is about one mbar.

Valve seat 35 comprises an aperture 37 through which air flows when valve 30 is cracked. Air stream, indicated generally by 42 helps lift ball 38. It is also recognized that if atmospheric 41 pressure is greater than well 14 pressure, ball 38 will be forced down onto seat 35 forming a seal blocking any reverse air flow into well 14. If reverse air flow were allowed into well 14, the air would be forced to travel through subsurface 13 surrounding the well. Air that enters subsurface 13 during high atmospheric pressure will dilute contaminated air in well 14 causing less contaminated mass to be released during periods of low atmospheric 41 pressure.

Top end 34 of chamber 31 is formed to receive exhaust pipe 40 through which contaminated gases from well 14 exit into atmosphere 41. Exhaust pipe 40 may be glued, or otherwise connected to top end 34. Exhaust pipe 40 may be bent such that precipitation does not easily enter chamber 32 through pipe 40. The top end of exhaust pipe 40 may also contain a screen (not shown) so that insects cannot enter chamber 32 and hinder the operation of valve 30.

The preferred embodiment, as shown in FIGS. 1 and 2, comprises a to compartmentalized apparatus 5. The apparatus is formed by riser pipe 10, valve 30 and exhaust pipe 40 that are coupled together. The modularity of the apparatus makes the apparatus easy to assemble and disassemble. Disassembly and reassembly may be required for maintenance purposes. Given the assembly's modularity, it is seen that apparatus 5 can be disassembled, repaired, cleaned and restored to operation if such problems arise.

FIG. 3 discloses a Baroball valve that is retrofitted to allow volume flow through valve 50 to be measured. The retrofitting of deployed Baroball valves 50 requires pressure ports 56 and 57 to be formed in the upper chamber 52 and in the top end 11 of riser pipe 5 of valve 50, respectively. A static pressure measuring device 55 is then placed in parallel to valve 50 for measuring the pressure differential between riser pipe 5 and upper chamber 52. Development of a standard curve for nominal device positions allows flow rate to be determined through valve 50.

In either embodiment, an electronic data storage mechanism (not shown) can be added for recording flow measurement over a period of time, as is well known to those skilled in the art.

The foregoing is provided for purposes of illustrating, explaining, and describing embodiments of the present invention that provides a system for improving and method for retrofitting the Baroball valve. Modifications and adaptations to these embodiments will be apparent to those skilled in the art and may be made without departing from the spirit of the invention or the scope of the following claims.

What is claimed:

1. An apparatus for passive removal of contaminants from an area of a subsurface and for measuring an amount of contaminant flowing through the apparatus under a low pressure differential between atmospheric pressure and well pressure, the subsurface having a well formed therein, the apparatus comprising:

a. a riser pipe having a first end and a second end, the first end having an aperture extending through the well into the subsurface and the second end rising up above the ground in use;

b. a valve in fluid communication with the second end of the riser pipe, the valve comprising:
      (1) a chamber with vertically extending walls,
      (2) a sealing mechanism;
      (3) a valve seat formed at the bottom of the chamber for receiving the sealing mechanism; and
      (4) measurement markers on the vertically extending walls for determining the flow rate through the valve at the low pressure differential, wherein the valve opens and closes when the atmospheric pressure is different from the pressure of the subsurface and the flow rate is measured by the height of the sealing nechanism in the valve chamber relative to the measurement markings, and wherein the valve of the apparatus serves as both a valve for sealing and for determining the flow rate through the valve, without requiring a separate value for each function.

2. The apparatus of claim 1, further comprising a ball as the sealing mechanism disposed in the chamber, the ball having a proper mass and surface area such that a slight difference in the pressure differential between the atmosphere and the subsurface causes the ball to lift from the valve seat allowing the well to breathe out into the atmosphere.

3. The apparatus of claim 2, wherein the ball for sealing the valve is flow responsive and movable within the valve chamber in response to varying flow rates of the subsurface contaminant stream.

4. The apparatus of claim 3, wherein the vertically extending chamber walls are transparent so a user can determine the height of the flow responsive ball in the chamber.

5. The apparatus of claim 1, wherein the first end of the riser pipe has a plurality of apertures thereat for allowing subsurface contaminants to enter the pipe.

6. The apparatus of claim 1, wherein the vertically extending chamber walls form a flow channel, the channel serving to direct a stream of contaminants through the apparatus for which the flow rate is to be measured.

7. The apparatus of claim 1, wherein the low pressure differential ranges within a few millibars and enables the sealing mechanism to measure flow rate.

8. The apparatus of claim 1, wherein the low pressure differential is no more than about one millibar and enables the sealing mechanism to measure flow rate.

9. The apparatus of claim 1, wherein the apparatus for passive removal does not require an external energy source for operation.

* * * * *